Nov. 21, 1961   L. F. TUMEY   3,009,229
MOLDING APPARATUS
Filed March 17, 1959   4 Sheets-Sheet 2
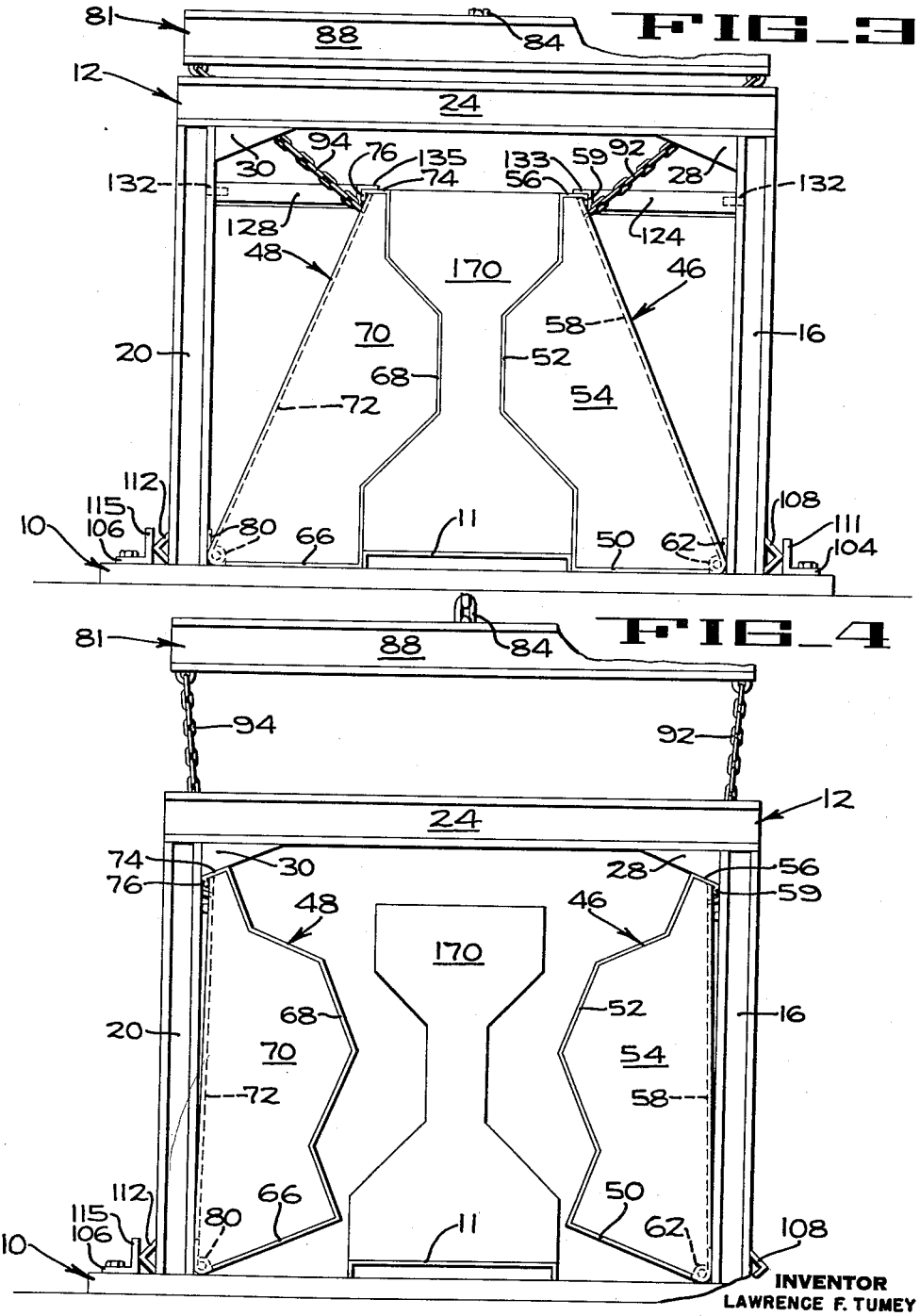
INVENTOR
LAWRENCE F. TUMEY
BY Hans G. Hoffmeister
ATTORNEY

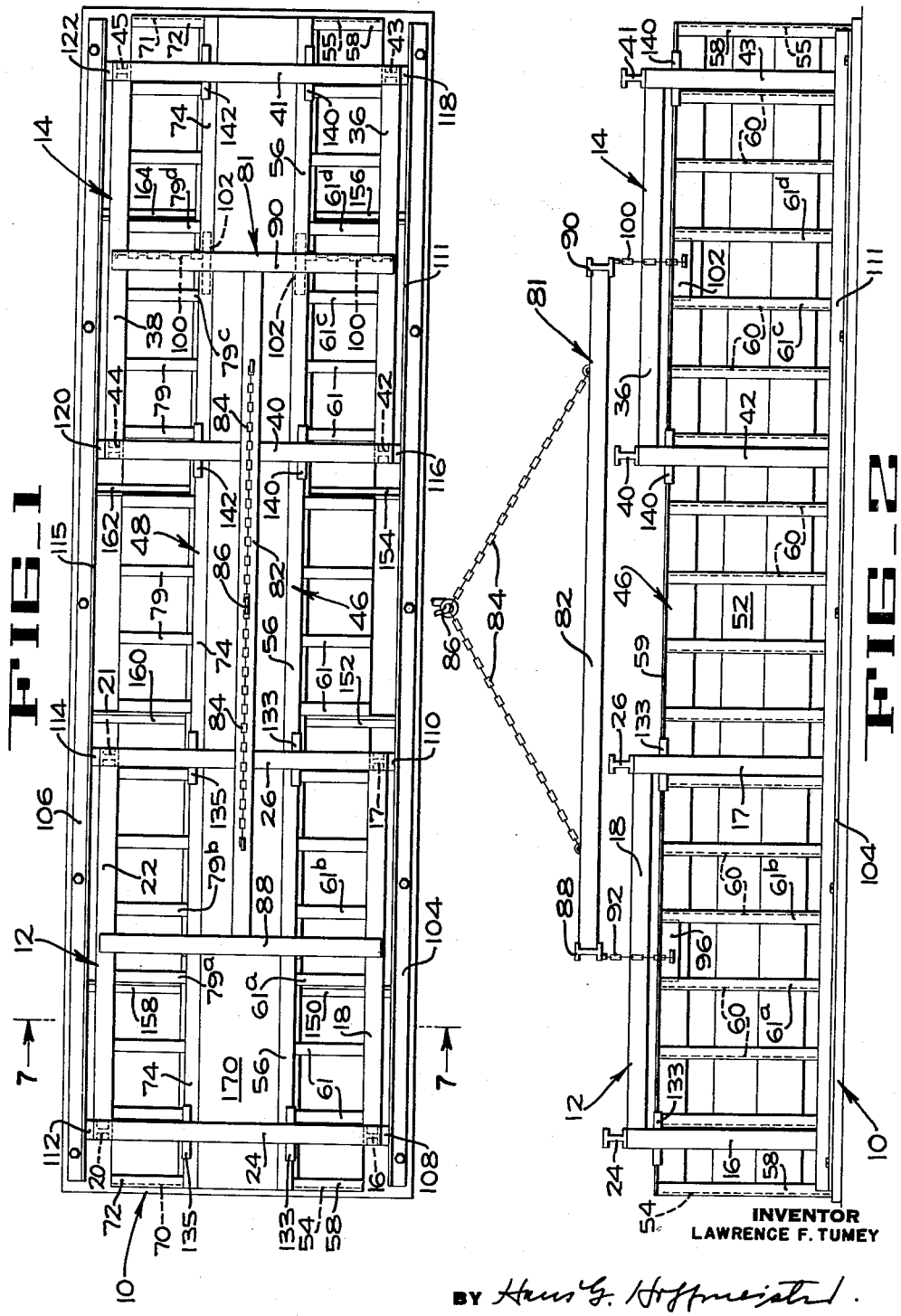

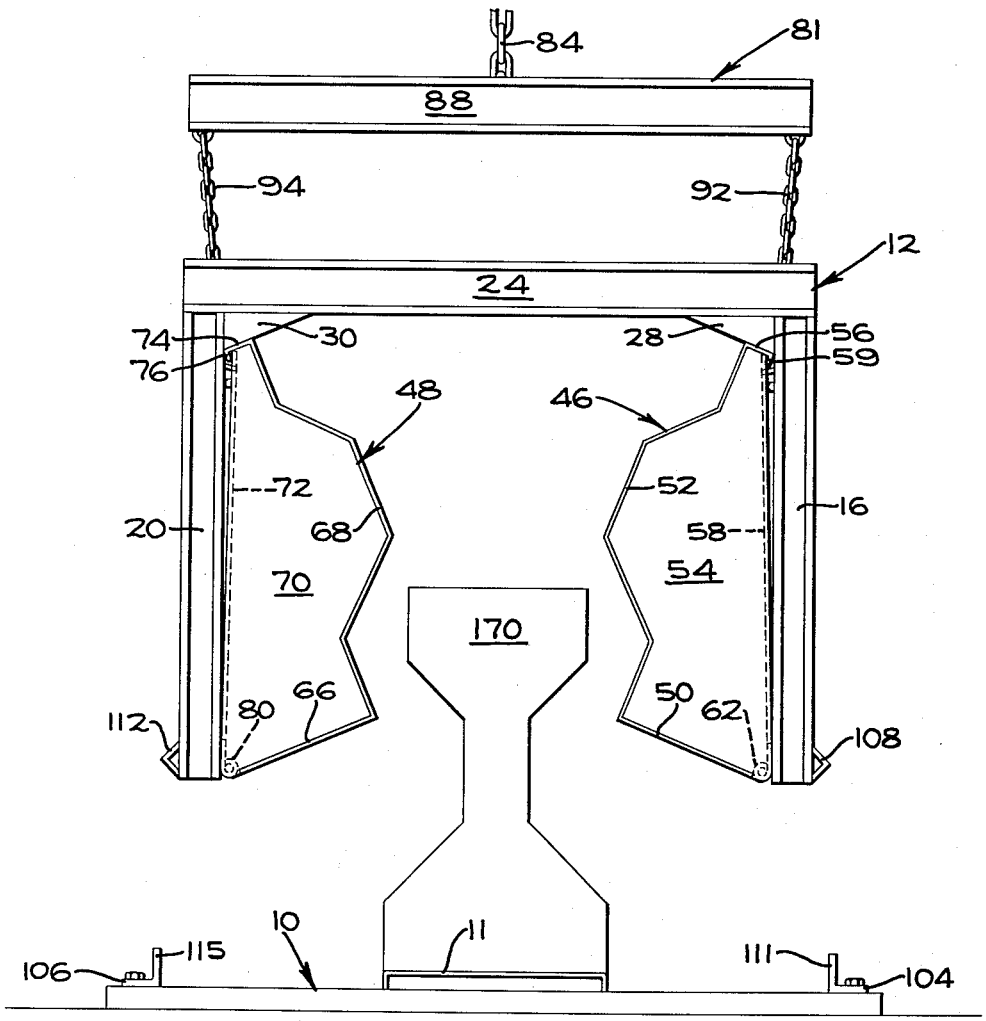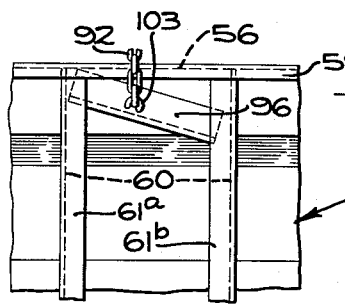

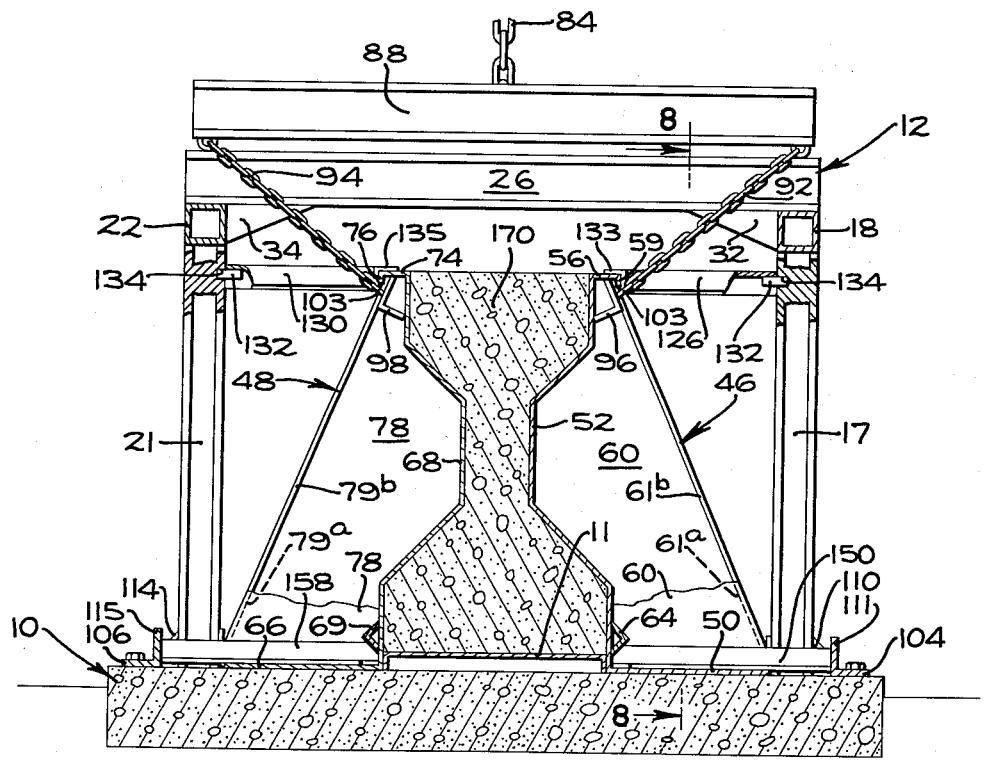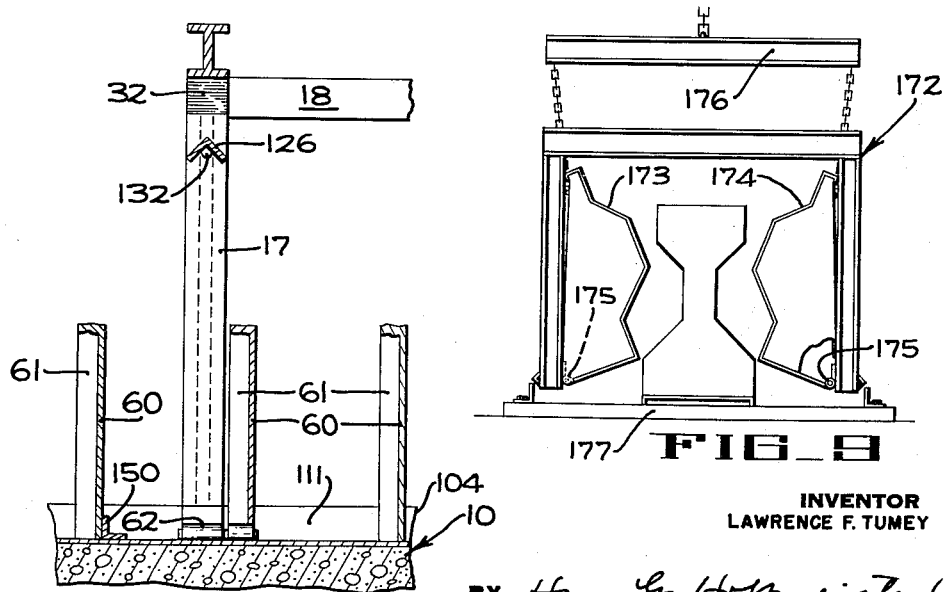

United States Patent Office 3,009,229
Patented Nov. 21, 1961

3,009,229
MOLDING APPARATUS
Lawrence F. Tumey, Lakeland, Fla., assignor to
FMC Corporation, a corporation of Delaware
Filed Mar. 17, 1959, Ser. No. 800,020
10 Claims. (Cl. 25—121)

The present invention relates to molding apparatus, and more particularly to mold boxes for forming concrete structural members.

Apparatus for the forming of concrete structural members conventionally includes a mold bottom form or base for supporting the molded concrete product, and mold side forms which cooperate with the base to define the mold cavity. The side forms may be stripped from the molded product a few hours after pouring when the product has hardened sufficiently to retain its shape. However, the molded concrete member must remain on the base for a day or more until cured to the required strength. It is therefore desirable, for high production casting techniques, to use a single set of side forms which is adapted for use with a multiplicity of mold bases.

Heretofore, concrete molds have been formed by means of a plurality of small sections that are aligned and bolted together. The handling of such small sections, including their correct placement in alignment with the base and their stripping from the hardened concrete member is time-consuming and costly. This is particularly true in the forming of members such as I-beams, which have surfaces which are not flat. The highest costs involved in the forming of concrete structural members have been those connected with the forming and dismantling of the molds.

It is therefore an object of the present invention to provide an improved molding apparatus, having mold sections that may be quickly and accurately assembled to form a mold and may be easily moved to disassembled position.

Another object of the invention is to provide improved molding apparatus having re-usable mold side forms that may be used with any one of a plurality of bases.

Another object of the invention is to provide improved means for handling molding apparatus.

Another object of the present invention is to provide power-operated means for stripping mold side forms from a molded product.

Another object of the invention is to provide power-operated means for locating mold side forms in position for a molding operation.

Another object of the invention is to provide means for reinforcing mold side forms during a molding operation.

These and other objects of the invention will become apparent from the following description and drawings in which:

FIG. 1 is a top plan of molding apparatus constructed in accordance with the invention, a molded concrete beam being shown in place.

FIG. 2 is a side elevation of the apparatus of FIG. 1.

FIG. 3 is an enlarged left end elevation of the apparatus of FIGS. 1 and 2, illustrating a first operational position thereof.

FIG. 4 is a view similar to FIG. 3, illustrating a second operational position of the apparatus.

FIG. 5 is a view similar to FIGS. 3 and 4, illustrating a third operational position of the apparatus.

FIG. 6 is an enlarged fragmentary side elevation of a portion of the apparatus of FIGS. 1–3.

FIG. 7 is an enlarged vertical section taken along the lines 7—7 of FIG. 1 with parts broken away.

FIG. 8 is a fragmentary vertical section taken along the lines 8—8 of FIG. 7.

FIG. 9 is an end elevation of another embodiment of the apparatus of the invention.

Referring to the drawings, and particularly to FIGS. 1–3, apparatus is shown for the forming of reinforced concrete I-beams. Said apparatus is adapted to be mounted on a flat, rectangular pouring bed 10 and includes a centrally located mold base 11 in the form of a longitudinally extending inverted channel which is preferably made of metal. The remainder of the apparatus to be described hereinbelow, is likewise preferably of metal construction.

Resting on the pouring bed 10, adjacent its left and right ends, respectively, as viewed in FIGS. 1 and 2, are two positioning and supporting frames 12 and 14 of identical structure. The frame 12 is similar to the frame of a rectangular table, and has along one side thereof two corner legs 16 and 17 in the form of I-beams interconnected at their upper ends by a longitudinally extending hollow beam 18. The frame 12 has along the other side thereof two corner legs 20 and 21 in the form of I-beams joined at their upper ends by a longitudinally extending hollow beam 22. The legs 16 and 20 are interconnected at their upper ends by a transversely extending I-beam 24, and the legs 17 and 21 are joined at their upper ends by a transversely extending I-beam 26. Two gussets 28 and 30 (FIG. 3) are provided at the two joints formed by the I-beams 24 with the legs 16 and 20, respectively. Two similar gussets 32 and 34 (FIG. 7) are provided at the two joints formed by the I-beam 26 with the legs 17 and 21, respectively. The elements of the frame 12 may be joined together by any suitable conventional means, such as welding.

The frame 14 is identical in structure to the frame 12, as has been stated hereinabove, and includes two longitudinally extending hollow beams 36 and 38 (FIG. 1), two transversely extending I-beams 40 and 41, four corner I-beam type legs 42, 43, 44 and 45, and four gussets (not shown) located at the four joints formed by the transversely extending I-beams 40 and 41 and the four corner legs.

Two mold side forms 46 and 48 (FIG. 3) of identical structure are situated on the pouring bed 10, said side forms extending substantially the full length of the pouring bed and along the opposite sides of the base 11 as seen in FIG. 3. Each side form extends through the positioning and supporting frames 12 and 14, respectively. The side form 46 (FIGS. 1–3) is hollow, having a flat bottom wall 50 which normally rests on the pouring bed 10, an inner side wall 52 contoured in accordance with the desierd I-shape of the concrete beam to be molded, a flat top wall 56 of lesser width than the bottom wall 50, and two flat end walls 54 and 55.

Each of the end walls 54 and 55 has a flange 58 which extends the full height of the end wall and projects perpendicularly therefrom. A flange 59 extends the full length of the top wall 56 and projects perpendicularly downward therefrom. A plurality of longitudinally spaced reinforcement partitions 60 (FIGS. 2, 7 and 8), having the same shape as the end walls 54 and 55 and disposed parallel thereto, are welded to the walls 50, 52 and 56 of the side form 46. Each of the partitions 60 has a reinforcing flange 61 which extends the full height of the partition and projects perpendicularly therefrom. Two particular flanges, designated 61a and 61b, are carried by adjacent partitions 60, located near the left end of the side form 46 as viewed in FIG. 2, and project toward one another. Similarly two particular flanges 61c and 61d of two adjacent partitions 60 located near the right end of the side form 46 project toward one another. The flanges 61 on the other partitions 60 may extend in either direction longitudinal of the side form 46.

The bottom wall 50 (FIG. 3) of the side form 46 is mounted upon four hinges 62 (one only being shown) which are secured to the wall 50 at spaced points longitudinally thereof. Each hinge 62 is also secured to one of the legs 16, 17, 42 or 43 of the frames 12 and 14. The side form 46 is thus mounted to be pivoted against the force of gravity between its position shown in FIG. 3 and that shown in FIG. 4. A longitudinally extending rib 64 (FIG. 7) in the form of an angle is secured to the inner surface of the side wall 52 adjacent the lower end thereof, to reinforce said side wall to prevent possible leakage of concrete between the side form 46 and the base 11.

As has been hereinbefore stated, the mold side form 48 (FIGS. 1, 3 and 7) is identical in structure to the side form 46 and comprises a bottom wall 66, a contoured inner side wall 68 bearing adjacent its lower end a reinforcing rib 69, two end walls 70 and 71 each having a longitudinally projecting flange 72, a top wall 74 having along its outer edge a downwardly projecting flange 76, and a plurality of partitions 78 each having a perpendicularly projecting flange 79. Four particular flanges 79a, 79b, 79c and 79d correspond in position to the flanges 61a, 61b, 61c and 61d, respectively, of the side form 46. The bottom wall 66 is mounted upon four hinges 80 (one only being seen in FIG. 3) connected to the legs 20 and 21 of the frame 12 and to the legs 44 and 45 of the frame 14. The form 48 is thus mounted for pivoting against the force of gravity between its position shown in FIG. 3 and that shown in FIG. 4.

The side forms 46 and 48 are arranged to be connected at their upper ends to an overhead carriage or lifting frame 81 which includes a longitudinally extending beam 82 (FIGS. 1 and 2) that is suspended by means of chains 84 from a hook 86 connected to a crane or similar lifting device (not shown), and supports at its ends two transversely extending lifting beams 88 and 90, respectively. The lifting beam 88 bears, suspended from its ends, two chains 92 and 94 (FIG. 7) which carry at their lower ends two angle bars 96 and 98, respectively.

As seen in FIGS. 2 and 6, the length of the bar 96 is such that it can be moved inwardly of the mold between the flanges 61a and 61b and then swung to a position normal to the partitions 60 with the ends of the bar behind the flanges. Then, as seen in FIG. 7, when the chain is pulled upward, the bar 96 will engage the top wall 56 of the mold and the inner surfaces of the flanges 61a and 61b. The bar 98 on chain 94 is similarly arranged to engage the top wall 74 of mold 48 and the inner surfaces of flanges 79a and 79b. The lifting beam 90 similarly serves to suspend two chains 100 (FIG. 1) carrying two angle bars 102 adapted to engage the upper ends of the side forms 46 and 48, respectively.

Each of the angle bars 96, 98 and 102 may be readily disengaged from the associated side form, a partially disengaged position of the angle bar 96 being shown in FIG. 6. To aid disengagement thereof, each angle bar is pivotally connected to the associated chain by means of a ring 103 secured to the outer surface of one flange of the angle bar, at a point spaced longitudinally from the longitudinal midpoint of the bar, as seen most clearly in FIG. 6 in the case of the angle bar 96 and chain 92. Thus, the angle bar 96, when freed from tight engagement with the side form 46, will pivot under the force of gravity about its connection to the chain 92 and into an inclined position such as shown in FIG. 6. Upon further disengagement, the angle bar 96 will pivot further, and ultimately will assume a substantially vertical position.

The chains 92 and 94 and the two chains 100 are disposed at such an angle, when the side forms 46 and 48 are in their closed position of FIG. 3, that upward movement of the lifting beams 88 and 90 will result in the exertion of a relatively large horizontal component of pulling force upon the upper ends of the side forms, and pivoting of the latter about the hinges 62 and 80, respectively, into their open or stripped position of FIG. 4. In the open position, the top walls 56 and 74 of the forms are in abutting contact with the slanted lower surfaces of the four gussets 28, 30, 32 and 34 of each frame 12 and 14. Further upward movement of the chains causes the frames 12 and 14 to be lifted together with the mold forms, the weight of the frames being transmitted to the chains entirely through the gussets and the top walls of the molds.

The mold forms are correctly positioned for a molding operation by means of two guides 104 and 106 (FIGS. 1 and 3) in the form of angle bars bolted to the upper surface of the pouring bed 10 and extending longitudinally along the side edges thereof, respectively. The two corner legs 16 and 17 of the frame 12 carry adjacent their lower ends two outwardly directed projections 108 and 110, respectively, each projection being in the form of an angle bar adapted to contact at its apex the upwardly extending flange 111 of the guide 104. Two similar projections 112 and 114 are mounted on the corner legs 20 and 21, respectively, for contact with the upwardly extending flange 115 of the guide 106. The frame 14 is likewise provided with two projections 116 and 118 adapted to contact the upwardly extending flange 111 of the guide 104, and two projections 120 and 122 adapted to contact the upwardly extending flange 115 of the guide 106.

In order to brace the upper ends of the side forms 46 and 48 against pressure exerted thereagainst by fluid concrete during the molding operation, a plurality of removable reinforcement struts are provided. Referring to FIGS. 3 and 7, it will be seen that four such struts, in the form of angle bars 124, 126, 128 and 130, are associated with the four corner legs 16, 17, 20 and 21, respectively, of the frame 12. At its outer end, each of the struts 124, 126, 128 and 130 has welded thereto a pin 132 (FIG. 8) which is received in a suitable seat 134 on the inwardly facing surface of the associated frame leg. The struts 124 and 126 have an angle bar 133 welded to their inner ends which is adapted to engage the top wall 56 and flange 59 of the side form 46. The struts 128 and 130 have an angle bar 135 welded to their inner ends which is adapted to engage the top wall 74 and flange 76 of the side form 48. Four struts (not shown) similar to those just described are associated with the four corner legs of the frame 14. Two of these struts, associated with the legs 42 and 43, have an angle bar 140 welded to their inner ends (FIG. 1), which engages the top wall 56 and flange 59 of the side form 46, while the other two struts have an angle bar 142 welded to their inner ends, which engages the top wall 74 and flange 76 of the side form 48.

Additional bracing means are provided at the lower ends of the side forms 46 and 48. This bracing means includes four longitudinally spaced struts 150, 152, 154 and 156 (FIG. 1) that are wedged between the vertical flange 111 (FIG. 7) of guide 104 and the lower end of wall 52 of the side form 46, and four longitudinally spaced struts 158, 160, 162 and 164 that are wedged between the vertical flange 115 of guide 106 and the lower end of wall 68 of the side form 48.

Conventional means such as removable plates (not shown) are provided for closure of the ends of the mold during the pouring and hardening of the concrete. Conventional prestressing cables (not shown) may also be provided, located in the space between the side forms 46 and 48.

In the operation of the apparatus of FIGS. 1–8, the frames 12 and 14 and the side forms 46 and 48 are initially in their positions shown in FIGS. 1–3. The upper reinforcement struts 124, 126, 128 and 130 for the frame 12 are in place, as are the corresponding upper reinforcement struts for the frame 14. The eight above-described lower reinforcement struts are likewise in place, as are the above-mentioned means for closing the ends of the mold. The concrete or other material to be molded is then poured into the mold defined by the base 11 and side forms 46 and 48, to thus form an I-beam 170. The exposed top surface of the I-beam 170 may then be subjected to treatment such as screening, this being facilitated by the positioning of the upper reinforcement struts at the sides of said top surface. When the I-beam 170 has sufficiently hardened, the upper and lower reinforcement struts and mold end closure means are removed manually, or by any suitable mechanical device.

The hook 86 is then raised by the associated crane or other lifting device, so as to raise the lifting frame 81. The chains 92 and 94 and the two chains 100 exert an upward and outward pull upon the angle bars 96 and 98 and the two angle bars 102, respectively. The side forms 46 and 48 are thus pivoted into their open position shown in FIG. 4, in which their top walls 56 and 74 come into abutment with the gussets 28, 32 and 30, 34, respectively, of the frame 12, and with the corresponding gussets of the frame 14. It is to be noted that while the side forms 46 and 48 are in the position shown in FIG. 4, they are in an inwardly unbalanced condition and, if released, will fall in response to the force of gravity into the position shown in FIG. 3. Upon further raising of the beam 82, the side forms 46 and 48 are lifted from the pouring bed 10, clear of the base 11 and the molded I-beam 170, and into the position shown in FIG. 5. The frames 12 and 14 are at the same time likewise lifted from the pouring bed 10, the weight of the frames being carried to the side forms 46 and 48 through the above mentioned gussets. It will be noted that the hinges 62 and 80 do not bear any of the weight of the frames.

The side forms 46 and 48 together with the frames 12 and 14 may, after the lifting thereof from the pouring bed 10, be transferred by the lifting frame 81 to a new location for re-use in cooperation with another base similar to the base 11 located on a pouring bed having guides thereon similar to the guides 104 and 106. When the beam 82 is lowered toward the pouring bed at the new location, the lower flanges of the projections 108, 110, 112 and 114 carried by the legs of frame 12, and the lower flanges of the projections 116, 118, 120 and 122 carried by the legs of frame 14 will contact the guides mounted on the pouring bed, and will guide the frames into a position corresponding to that of FIG. 4. The side forms 46 and 48 will then, upon further lowering of the beam 82, pivot under the force of gravity into their position of FIG. 3, ready for the pouring of another I-beam.

After the frames 12 and 14 and the side forms 46 and 48 have been so placed in correct operating position at the new location, the angle bars 96, 98 and 102 can be disconnected from the side forms 46 and 48 by still further lowering of the beam 82. Each of the angle bars 96, 98 and 102 will consequently be lowered, at first pivoting into an inclined position of partial disengagement from the associated side form, such as the position shown in FIG. 6 for the angle bar 96, and finally pivoting into a substantially vertical position of full disengagement from the associated side form. The lifter frame 81 can then be re-used to lift other side forms similar to the side forms 46 and 48.

In FIGURE 9 a second embodiment of the molding apparatus of the present invention is illustrated. In this embodiment, a positioning and supporting frame 172 is provided, corresponding in every respect to either of the frames 12 and 14 of the apparatus of FIGS. 1–8, except for the absence in the frame 172 of any gussets such as the gussets 28, 30, 32 and 34 carried by each of the frames 12 and 14. Side forms 173 and 174 are mounted on the positioning and supporting frame 172 by means of four hinges 175 (two only being shown). The four hinges 175, however, are designed to support the weight of the frame 172 when the side forms 173 and 174 are lifted.

The operation of the apparatus of FIG. 9 is identical to that of FIGS. 1–8, except for the fact that when the side forms 173 and 174 of FIG. 9 are pivoted into open position and lifted from the pouring bed 177 by a lifting frame 176, a lifting force is transmitted to the frame 172 through the hinges 175. Thus, when the side forms 173 and 174 and the frame 172 are raised from the pouring bed into a position such as shown in FIG. 9, the full weight of the frame 172 will be borne by the hinges 175.

It will be realized that, although the invention has been described with reference to the use of side forms designed for the molding of I-beams and having a length requiring the use of the two frames 12 and 14, side forms of any desired shape and length, and any suitable number of frames may be employed. If a product that is relatively short is to be molded, only one of the frames 12 and 14 may be sufficient.

While I have described a particular embodiment of the present invention, it will be understood that various changes and modifications may be made without departing from the spirit of the present invention and the scope of the appended claims.

Having thus described my invention what I claim and desire to protect by Letters Patent is:

1. Mold apparatus for casting an article, said apparatus comprising a frame, a set of laterally spaced mold side forms having opposed faces for forming the sides of the cast article, means mounting the lower ends of said forms in said frame for pivotal movement relative to said frame between a closed position wherein said opposed faces of the forms have a minimum separation for receiving moldable material and an open position wherein the opposed faces of said forms are further separated for causing said faces to clear the sides of the molded product, vertically movable lifting means above said forms and frame, tension means connecting said lifting means to said forms for causing upward motion of said lifting means to exert a force tending to pivot said forms from their closed to their open position, vertically upward motion of said lifting means being arranged to first move said forms from their closed to their open position, continued upward motion of said lifting means being effective to raise said forms and said frame as a unit away from the molded product.

2. Mold apparatus for casting an article having indented vertically disposed sides, said apparatus comprising a frame, a set of laterally spaced mold side forms, the opposed faces of said forms having laterally inward extending projections for forming the indented sides of the cast article, means mounting the lower ends of said forms on said frame for pivotal movement relative to said frame between a closed position wherein said opposed faces of the forms have a minimum separation for receiving moldable material and an open position wherein the opposed faces of said forms are further separated for causing said projections to vertically clear the sides of the molded product, vertically movable lifting means above said forms and frame, tension means connecting said lifting means to said forms for causing upward motion of said lifting means to exert a force tending to pivot said forms from their closed to their open position, vertically upward motion of said lifting means first moving said forms from their closed to their open position, continued upward motion of said lifting means raising said forms and said frame as a unit away from the molded product.

3. Mold apparatus for casting an article, said apparatus comprising a frame, a set of laterally spaced mold side forms having opposed faces for forming the sides of the cast article, means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, a vertically downwardly facing gusset carried by said frame above each form, a top wall on each of said forms for engaging certain of said gussets when the form is in its open position, vertically movable lifting means above said forms and frame, tension means connecting said lifting means to said forms for causing upward motion of said lifting means to exert a force tending to pivot said forms from their closed to their open position, vertically upward motion of said lifting means first moving said forms from their closed to their open position, until the top walls on said forms engage their respective gussets, continued upward motion of said lifting means raising said forms and said frame as a unit away from the molded product.

4. Mold apparatus for casting an article, said apparatus comprising a frame, a set of laterally spaced mold side forms having opposed faces for forming the sides of the cast article, means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, inclined flange means on each form, abutment means at an upper portion of said inclined flange means, movable lifting means above said forms and frame, a bar slidable along the inclined flange means of each form, tension means connecting said lifting means to said bars for causing upward motion of said lifting means to first bring said bars into engagement with their abutment means to thereafter exert a force tending to pivot said forms from their closed to their open position, further vertically upward motion of said lifting means moving said forms from their closed to their open position, continued upward motion of said lifting means raising said forms and said frame as a unit away from the molded product.

5. Mold apparatus for casting an article, said apparatus comprising a frame, a set of laterally spaced mold side forms having opposed faces for forming the sides of the cast article, hinge means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, vertically movable lifting means above said forms and frame, tension means connecting said lifting means to said mold side forms for causing upward motion of said lifting means to exert a force tending to pivot said forms from their closed to their open position, vertically upward motion of said lifting means first moving said mold side forms from their closed to their open position, continued upward motion of said lifting means raising said mold side forms and said frame as a unit away from the molded product, with said hinge means supporting the weight of said frame.

6. Mold apparatus for casting an article, said apparatus comprising a rigid frame, said frame having cross members and laterally spaced depending legs, a set of laterally spaced mold side forms having opposed faces for forming the sides of the cast article, means mounting the lower ends of said forms on the lower ends of said legs for pivotal movement relative to said frame between a closed position wherein said opposed faces of the forms have a minimum separation for receiving moldable material and an open position wherein the opposed faces of said forms are further separated for causing said faces to clear the sides of the molded product, vertically movable lifting means above said forms and frame, tension means connecting said lifting means to said forms for causing upward motion of said lifting means to exert a force tending to pivot said forms from their closed to their open position, vertically upward motion of said lifting means first moving said forms from their closed to their open position, continued upward motion of said lifting means raising said forms and said frame as a unit away from the molded product.

7. Mold apparatus for casting an article, said apparatus comprising a frame, a set of laterally spaced mold side forms having opposed faces for forming the sides of the cast article, means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, downwardly inclined wedge means on said frame, abutment means on said forms for engaging said wedge means when the forms are in their open position, vertically movable lifting means above said forms and frame, tension means connecting said lifting means to said forms with the points of connection to said lifting means being spaced laterally outwardly of the points of connection with said forms for causing upward motion of said lifting means to exert a force tending to pivot said forms from their closed to their open position, vertically upward motion of said lifting means first moving said forms from their closed to their open position with said abutment means engaging said wedge means, continued upward motion of said lifting means raising said forms and said frame as a unit away from the molded product.

8. Mold apparatus for casting an article, said apparatus comprising a frame, a set of laterally spaced mold side forms having opposed faces for forming the sides of the cast articles, means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, a pair of longitudinally spaced flanges on the outer side of each form, bar abutments at upper portions of said flanges, vertically movable lifting means above said forms and frame, a bar slidable along each pair of flanges, tension means connecting said lifting means to each bar at a point closer to one end of the bar than to the other end, said tension means being connected to said lifting means at points displaced laterally outward of said frame, vertically upward motion of said lifting means first bringing said bars into engagement with said abutment means, further upward motion moving said mold side forms from their closed to their open position, continued upward motion of said lifting means raising said forms and said frame as a unit away from the molded product.

9. Mold apparatus for casting an article, said apparatus comprising a frame, a set of laterally spaced mold side forms having opposed faces for forming the sides of the cast article, hinge means mounting the lower ends of said forms on said frame for pivotal movement relative to said frame between a closed position wherein said opposed faces of the forms have a minimum separation for receiving moldable material and an open position wherein the opposed faces of said forms are further separated for causing said faces to clear the sides of the molded product, vertically movable lifting means above said forms and frame, tension means connecting said lifting means to said forms for causing upward motion of said lifting means to exert a force tending to pivot said forms from their closed to their open position, vertically upward motion of said lifting means first moving said forms from their closed to their open position, continued upward motion of said lifting means raising said forms and said frame as a unit away from the molded product, said hinge means being disposed at the laterally outer sides of said forms for causing a gravity return of the forms to their closed position upon release of the forms by said lifting means.

10. Mold apparatus for casting an article, said apparatus comprising a frame, a set of laterally spaced mold side forms having opposed faces for forming the sides of the cast article, the laterally outer sides of the lower ends of said forms being pivotally mounted on said frame with said forms being urged by gravity for pivotal movement relative to said frame toward a closed position for receiving moldable material, a pouring bed for supporting said forms in their closed position against the force of gravity, stop means on said frame for engagement by said forms with the latter in an open position wherein the opposed faces of said forms are separated sufficiently to clear the sides of the molded product, vertically movable lifting means above said forms and frame, tension means connecting said lifting means to said forms for causing upward motion of said lifting means to exert a force tending to pivot said forms from their closed to their open position, vertically upward motion of said lifting means first moving said forms from their closed to their open position and against said stop means, continued upward motion of said lifting means raising said forms and said frame as a unit away from the molded product.

References Cited in the file of this patent

UNITED STATES PATENTS

| | | |
|---|---|---|
| 435,839 | Hunter | Sept. 2, 1890 |
| 660,219 | McClintick | Oct. 23, 1900 |
| 1,106,651 | Harris | Aug. 11, 1914 |
| 1,983,757 | Hick | Dec. 11, 1934 |
| 2,449,732 | Voege | Sept. 21, 1948 |
| 2,495,100 | Henderson | Jan. 17, 1950 |
| 2,583,626 | Buell | Jan. 29, 1952 |
| 2,614,309 | Price | Oct. 21, 1952 |

FOREIGN PATENTS

| | | |
|---|---|---|
| 889,923 | France | Oct. 18, 1943 |
| 844,727 | Germany | July 24, 1952 |
| 143,642 | Sweden | Jan. 12, 1954 |